Jan. 5, 1932.

T. H. KRUEGER

TAPE SERVING DEVICE

Re. 18,321

Original Filed July 19, 1921 3 Sheets-Sheet 1

Theodore H. Krueger
INVENTOR

BY

Moser & Hammond Morse & Roth
ATTORNEYS

T. H. KRUEGER

Jan. 5, 1932. TAPE SERVING DEVICE Re. 18,321

Original Filed July 19, 1921 3 Sheets-Sheet 2

INVENTOR
Theodore H. Krueger
BY
Mason, Hammond, Morse & Kolle
ATTORNEYS

T. H. KRUEGER

Jan. 5, 1932. TAPE SERVING DEVICE Re. 18,321

Original Filed July 19, 1921 3 Sheets-Sheet 3

Theodore H. Krueger INVENTOR

BY Moser, Hammond, Morse & Wolter

ATTORNEYS

Reissued Jan. 5, 1932 Re. 18,321

UNITED STATES PATENT OFFICE

THEODORE H. KRUEGER, OF PUTNEY, STRATFORD, CONNECTICUT, ASSIGNOR TO BETTER PACKAGES, INC., OF NEW YORK, N. Y., A CORPORATION OF NEW YORK

TAPE SERVING DEVICE

Original No. 1,567,655, dated December 29, 1925, Serial No. 485,868, filed July 19, 1921. Application for reissue filed August 20, 1931. Serial No. 558,405.

This invention relates to devices for delivering tape and is particularly adapted for serving pieces of gummed paper tape in a moistened condition ready for being applied to parcels and wrappers.

More particularly the invention proposes a machine which, in one form of its embodiment, consists of a pivoted feed arm, provided with a gripper mechanism which is arranged to advance the tape when the arm is oscillated, the said gripper mechanism being arranged to co-operate with a circular guide concentric with the pivot of the feed arm.

It proposes, moreover, to associate a tape severing device with the said feed arm and provides mechanism whereby a single handle may be employed for selectively operating the feeding and severing mechanism. Means are preferably provided for rendering the severing mechanism operative only at the end of a feed stroke of the feed arm, and before the return stroke thereof.

The above and various other features and objects of the invention, which will hereinafter appear, will now be more particularly set forth in the following description from which a good understanding of the invention may be had, reference being made to the accompanying drawings in which:—

Similar characters of reference designate similar parts in each of the several views.

Figure 1:
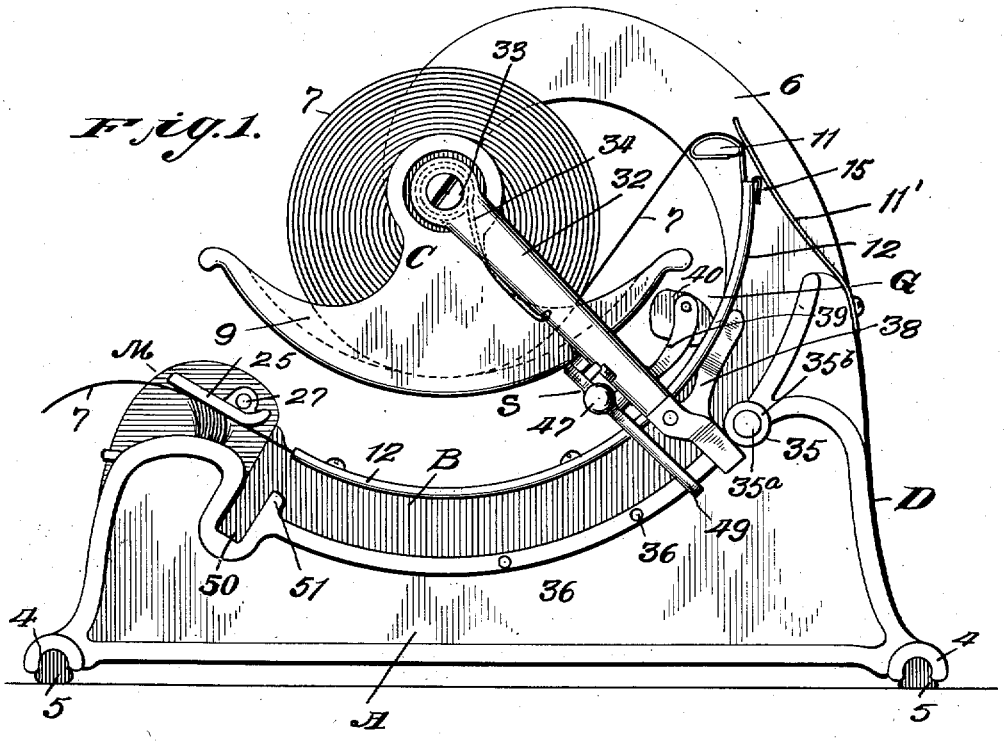
Figure 1 is a side elevation illustrating one form of embodiment of the invention.

The tape serving device illustrated in the drawings comprises a casing D, ornamental in shape and consisting of a forward side wall A and a rearward side wall B, these walls being spaced from each other by a lug 1 (shown in Figure 3), and a rear wall 2 (shown in Figure 2), both lug and wall being integral with A and secured to B by machine screws 3. The side walls are provided at their lower edges with lugs 4 having recesses in which are secured members 5 of rubber or other elastic material, which serve as feet and thus prevent scratching or other injury to the surface of the counter or other table on which the device will ordinarily be placed in practical use.

Figure 4:
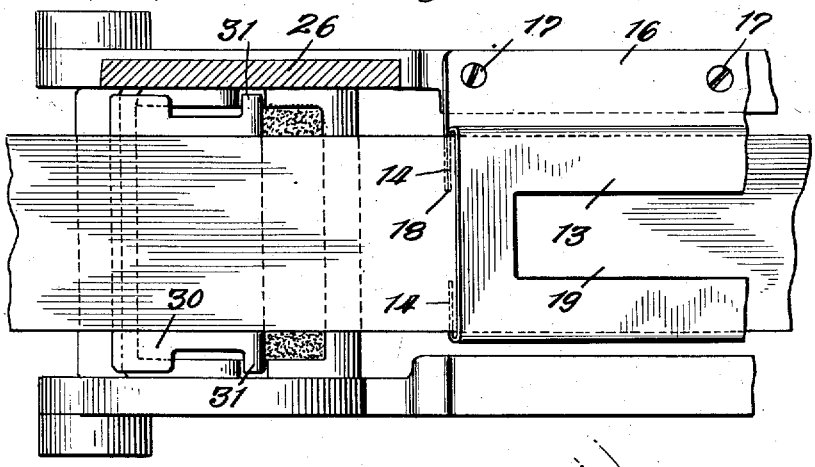
Figure 4 is a plan view of Figure 3, part of the device being in section as indicated by lines IV—IV of Figure 3.
Figure 5:
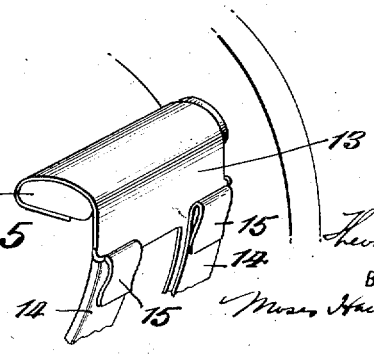
Figure 5 is a perspective view illustrating the upper end of the guide for the tape.

Extending upwardly from the side wall B is a curved arm 6 which supports the cradle C into which is placed a roll of tape 7. This cradle is formed of a rear plate 8 (Figure 6) integral with arm 6, and a forward plate 9 which is integral with the bottom wall of the cradle, this wall being secured to the side wall 8 by means of machine screws 10. The tape 7 passes over a stud 11 on arm 6 and enters a guide 12 which is circular in form and somewhat greater than 90 degrees in length. The guide is constructed of a piece of sheet metal (Figures 4 and 5), which at one end is bent about the stud 11, and which at its edges is provided with turned-over flanges 14, for forming a guideway for the tape. The upper ends of the flanges 14 are turned backward, as illustrated at 15 in Figure 5, to facilitate the insertion of the tape into the guideway. The lower part of the guide 12 is secured to the side wall B of the casing by means of screws 17 cooperating with a strip 16 which is preferably integral with the sheet metal guide, being formed, as indicated in Figure 4, by an extension of the flange 14 bent backward on itself at 18. An opening 19 is provided longitudinally in the guide for a purpose which will appear hereinafter. A leaf spring 11′ is secured to the rear wall 2 of the casing D and bears upon the tape passing over the position of the tape guide on the stud 11 to put a slight resistance on the tape and prevent any rearward movement of the tape on the reverse stroke of the feeding arm.

Figure 2:
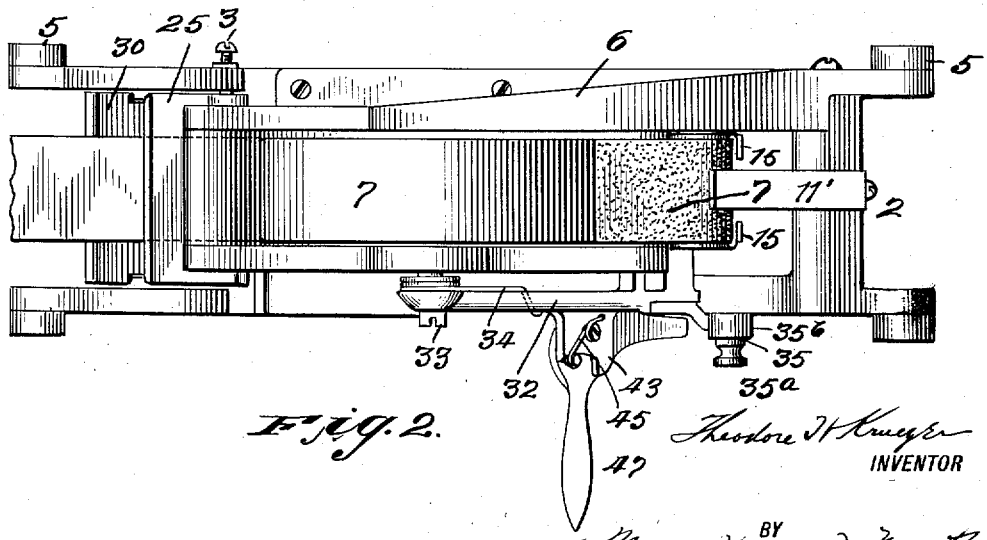
Figure 2 is a plan view of Figure 1.
Figure 3:
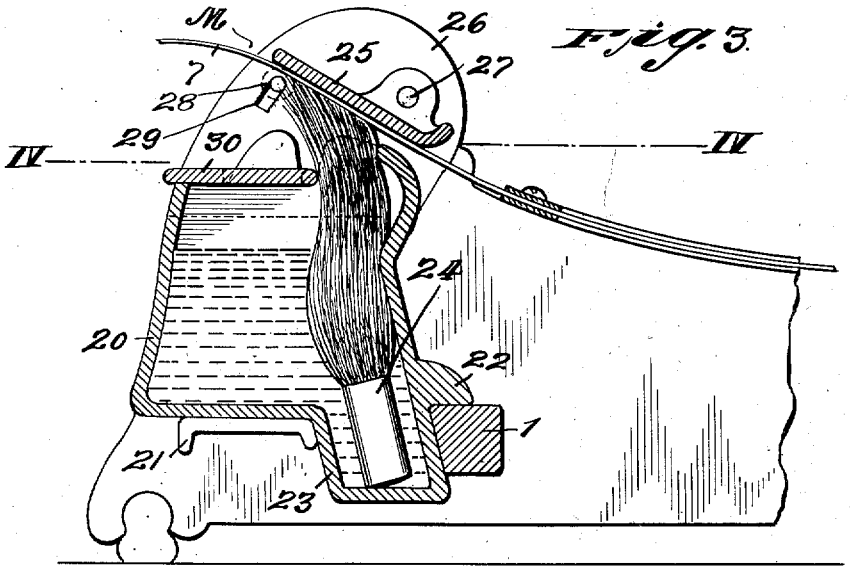
Figure 3 is a detail view of the moistening device illustrated in vertical section.

From the guide the tape passes into a moistener M, which in the illustrated form of embodiment consists of a receptacle 20, preferably of bronze or other non-corrosive metal, which is supported in the casing of the device by means of shoulders 21 formed in the walls A and B and by means of a flange 22 on the rear wall of the receptacle, which flange is arranged to seat upon the stay or lug 1. The right end of receptacle 20 (as viewed in Figure 3) is provided with a recess for receiving the head of a moistening brush 24, the bristles of which extend above receptacle 20. A pressure bar 25, provided for the purpose of holding the lower, gummed surface of tape 7 firmly against the ends of the bristles, is secured by means of a screw 27 to a wall 26 extending upwardly from receptacle 20, and forming in fact, a continuation of the side wall B of the casing, as indicated in Figures 1, 2 and 4. The angular position of the pressure bar is governed by a stop 28 adjustable in a slot 29. By the aid of this stop the operator is enabled to return the pressure bar to its proper position after he has tilted the bar upwardly for any reason, as for example, for removing the brush for cleaning purposes.

At its forward end the receptacle 20 is provided with a cover plate 30 which has studs 31 whereby the plate is pivotally associated with receptacle 20, this receptacle being provided with suitable openings for receiving said studs. The cover plate extends slightly beyond the upper wall of the receptacle and may thus be readily lifted for the purpose of renewing the liquid in the receptacle.

For the purpose of advancing the tape through guide 12 and past the moistener M, I provide an oscillatory gripping mechanism G, which is mounted on a rocker or feed arm 32 pivoted on the shank of a screw 33 mounted in the forward plate 9 of the cradle C. A spring 34 serves to bias the arm toward the right (as viewed in Figure 1) so that the lowermost end thereof engages a stop 35 mounted in one of the plurality of holes 36 adjacent the upper edge of the side wall A. In the present instance, the stop 36 comprises a screw 35 having a knurled head and provided with a collar 35*b* of rubber or other suitable material for absorbing shocks. A fixed stop 51 is provided on plate A for limiting the left or forward motion of the arm.

Figure 6:
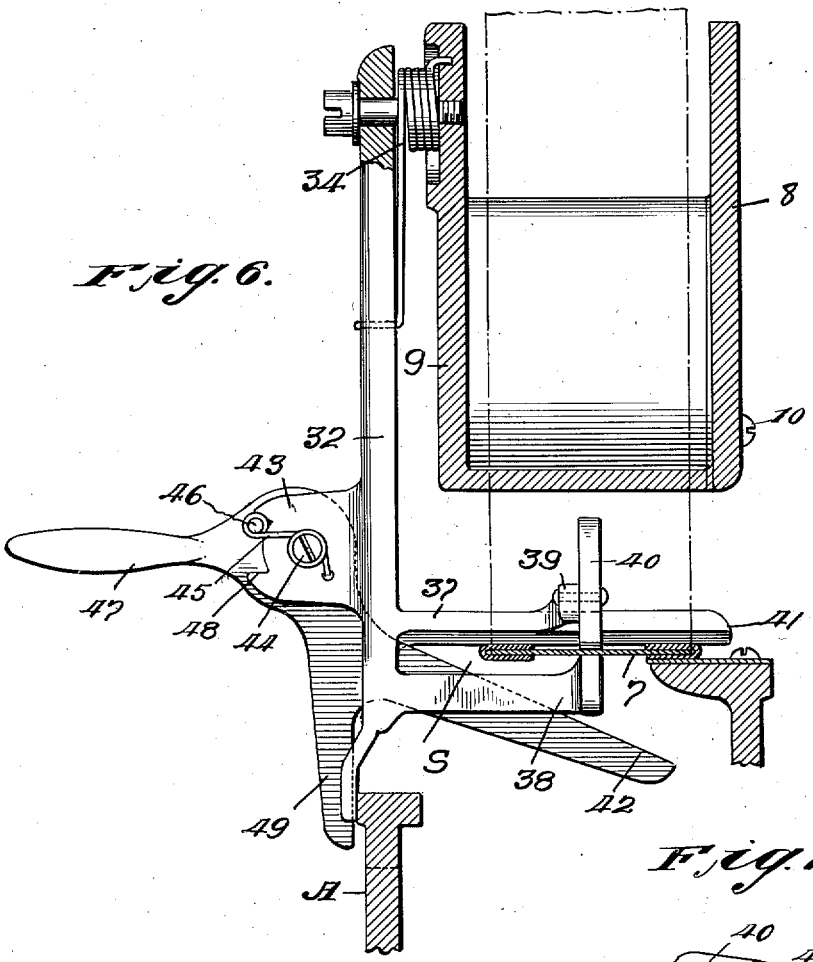
Figure 6 is a view showing the rocker arm and its associated mechanism, as seen from the right in Figure 1.
Figure 7:
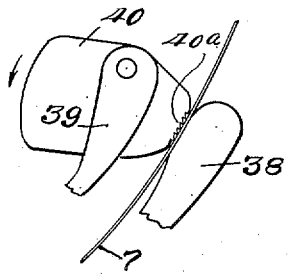
Figure 7 is a detail view illustrating the gripping mechanism.

Integral with arm 32 and extending across guide 12 are provided members 37 and 38 (Figure 6), the former being above and the latter being below, the guide. Adjacent the center line of the opening 19 of the guide, the member 37 is provided with a rearwardly extending portion 39 (Figure 1) in which is pivoted a dog 40, which by gravity or otherwise is biased to turn counter-clockwise about its pivot into the position indicated in Figure 1. In this position the eccentric surface 40*a* of the dog is in engagement with the tape, as illustrated in Figure 7. Opposite face 40*a* the tape is engaged by the member 38 of arm 32. When the arm 32 is moved toward the left (Figure 1) the dog will rotate slightly in the direction of the arrow in Figure 7, owing to the friction between the tape and surface 40*a*. This rotation has the effect of increasing the pressure between the dog and the member 38, owing to the eccentricity of the surface, the radius of the part of the surface 40*a* which is thus brought to bear against the tape being slightly greater. The tape is thus securely gripped between the dog and the member 38 and will follow the forward movement of the arm. A rearward movement of arm 32, however, will release the grip on the tape for the reason that the dog 40 is rotated in the reverse direction, and thus presents to the tape a part of its surface having a smaller radius. During the backward movement of arm 32, therefore, the tape remains stationary.

To enhance the effectiveness of the gripping action the surface 40*a* of the dog is preferably roughened or provided with ratchet teeth, as indicated in Figure 7. By reference to Figure 1, it will be observed that the lower surface of the cradle C is so close to the upper edge of the dog that the same cannot be turned clockwise beyond a small angle sufficient to permit of the proper operation of the dog. By virtue of this feature the dog is restrained from being accidentally turned over clockwise into an inoperative position. Proper operation of the gripping device at all times is thus assured.

For the purpose of severing the tape after it has been advanced by the mechanism just described, I provide the arm 32 with a cutting device S which comprises a knife edge 41 provided on the member 37 hereinabove mentioned, and a second knife edge 42 which is arranged to cooperate with the knife edge 41 in the manner of a pair of shears. The blade 42 is pivoted on a lug 43 on arm 32 by means of a screw 44 about which is coiled a spring 45 which serves to bias the blade to the open position, as illustrated in Figure 6. A stop 46 mounted on a handle 47, integral with the pivot of blade 42, cooperates with a recess 48 in lug 43 to limit the opening and closing movements of the shears.

An arm 49 integral with blade 42 extends below the upper edge of the side wall A of the casing. The operation of the cutting device therefore, is impossible in any position of arm 32 except at its extreme left (as viewed in Figure 1) at which point the wall A is provided with a recess 50 for permitting the passage of the arm 49.

When the feeder arm 32 is in this position, the cutting edge 41 of member 37 extends beyond, i. e. to the left guide 12, and the blade 42 is in a similar position. A depression, therefore, of handle 47 will operate the shears and thus sever the tape at a point between the moistener M and guide 12.

The operation of the tape serving device will now be readily understood:—

The roll of tape is placed into the cradle and the end of the tape is passed over the stud 11 and into the guide 12, so as to enter between the jaws of the gripping device, the gummed surface of the tape being turned face downwardly in the guide. The arm 32 is then operated to feed the tape into the forward end of the guide. The device is then ready for use.

To obtain a strip of moistened tape, the operator grasps the handle 47 and pulls the feed arm 32 towards him, so that the tape in guide 12 is pushed through the moistener M and beyond. When the feed arm reaches the forward limit of its motion, the operator depresses handle 47 and thus severs the tape. He then releases the handle and the spring 34 operates the feed arm back against stop 35.

A definite length of strip will thus be obtained from the device and this length may be adjusted by the adjustment of the position of stop 35, as will be readily understood. An indefinite length of strip may be obtained, however, by moving the feed arm 32 back and forth several times before the strip is finally severed.

It will be observed that in the device of my invention, a positive feed is obtained by the secure hold on the tape afforded by the gripping device, and the operation of a single handle is sufficient to bring about both the feeding and the cutting of the tape. The cutting device travels with the feed arm, and the cutting operation takes place at the end of the feed operation and before the return stroke. The gripping device proper is a very simple, but effective, construction. The circular tape guide and pivotal mounting of the feed arm, moreover, so simplify the entire device that it comprises but very few moving parts. The whole mechanism, therefore, is of extraordinary low cost of manufacture, simple in operation and ornamental in appearance.

Furthermore, it will be observed that the gripping device engages and feeds the paper without penetrating it. This is a desirable feature since the smooth surface of the paper is not damaged or marred in any way, and always presents a good appearance, when applied to a package; also, by keeping the surface of the paper smooth, its passage through the moistener is facilitated.

Although I have herein shown and described only one specific form of embodiment of the invention, it will be readily understood that many changes and modifications may be made therein without departing from the spirit and scope of the invention, it being my intention to claim the same broadly in whatever form its principles may be employed.

What I claim is:—

1. In a tape feeding device, a pivoted arm, an operating handle fixed thereon, and a tape gripping mechanism mounted on said arm, said mechanism comprising a pivoted gripping member having an eccentric gripping surface.

2. In a tape feeding device, a pivoted arm, means limiting the angular movements of said arm, and a tape gripping mechanism operative in only one direction of movement of said arm, associated with said arm, said mechanism comprising members for passing over opposite sides of the tape, one of said members being provided with an eccentric surface constantly in engagement with the tape and automatically tiltable upon movement of the arm in one direction into clamping cooperation with the other member.

3. A tape gripping device comprising a pair of members arranged to pass over opposite faces of the tape, one of said members being pivoted eccentrically to move into engagement with the other, and means automatically operative upon movement of said members in one direction for increasing the force of engagement of said members with said tape.

4. A tape gripping device comprising a plurality of members arranged to pass over opposite faces of the tape, and a common support therefor, one of said members being pivotally mounted and provided with an eccentric surface constructed and arranged to rotate into firm gripping engagement with said tape as a result of movement of said support in a predetermined direction relatively to said tape.

5. A gripping device comprising a plurality of members for engaging a piece of tape from opposite sides one of said members being pivoted to rotate relatively to the other and provided with an eccentric surface in advance of its pivot whereby, as a result of movement of said members in one direction relatively to said tape, the pressure of the members on said tape is increased so that said tape will be fed by the members in said one direction but not in the opposite direction.

6. In a tape serving device, a gripping and feeding mechanism, a severing mechanism operable at the option of the operator, and means for mounting said mechanism for reciprocatory movement together.

7. In a tape serving device, a gripping mechanism, a severing mechanism including an operating handle, and means for mounting said mechanism for reciprocatory movement together, said means comprising a pivoted lever arm.

8. In a tape serving device, a gripping mechanism, a manually operable severing mechanism, means for mounting said mechanisms for reciprocatory movement together, and means for preventing operation of said severing mechanism, except at a definite point in the movement of said mechanism.

9. In combination, a feeding mechanism, a severing mechanism including a severing handle operable at the option of the operator, means for mounting said feeding mechanism and severing handle for reciprocatory movement together between limits, and means for preventing operation of said severing handle except at one of said limits.

10. In combination, means for guiding a strip through a circular arc, means for feeding said strip through said arc, and means operative at the limit of said arc for severing said strip, said means comprising a manually operable member for actuating said strip severing means mounted for movement in unison with the feeding means.

11. In combination, a pivoted strip feeding mechanism, and means for guiding the strip through the arc of movement of said mechanism, said mechanism comprising a freely pivoted clamping dog arranged to grip said tape at any point of said arc, a carrier on which the dog is pivoted, and operating means for the carrier independent of the dog.

12. In combination, a guide, a feeding mechanism operative throughout said guide, a moistening mechanism, and a manually operable severing mechanism including an operating handle movable throughout said guide but operative only at a point between said moistening mechanism and said guide.

13. In combination, a feeding mechanism, a severing mechanism, an operating member for both of said mechanisms, and means for causing operation of one or the other of said mechanisms according to the direction of force applied to said member.

14. In combination, a feeding mechanism, a severing mechanism, a handle for causing operation of said mechanisms, means for rendering a movement of translation of said handle effective to operate one of said mechanisms, and a movement of rotation effective to operate the other of said mechanisms.

15. In combination, a feeding mechanism, a severing mechanism, a handle associated with both of said mechanisms, means responsive to a pull on said handle for causing said mechanisms to feed the tape, and means responsive to a depression of said handle to sever said tape.

16. A tape feeding and severing mechanism comprising an operating handle means responsive to a pull of said handle for causing said mechanism to feed the tape, means responsive to a depression of said handle for causing said mechanism to sever said tape, and means for preventing depression of said handle except at the end of a feeding stroke of said handle.

17. In combination, tape-moistening means, a rocker arm, a tape guide concentric with said rocker arm, and means comprising a pivotally mounted dog having an eccentric surface associated with said arm for gripping the tape through the guide to thrust the tape in one direction along the guide to the moistening means when said arm is reciprocated.

18. In combination, a rocker arm, a continuous tape guide concentric with said rocker arm, means associated with said arm for feeding the tape in one direction when said arm is reciprocated manually operable tape severing means including cutting members and a handle carried by said arm, and means for preventing actuation of said handle to operate the severing means except at the end of a feeding stroke beyond the end of the tape guide.

19. In combination, a rocker arm, a tape guide concentric with said rocker arm, means associated with said arm for feeding the tape in one direction when said arm is reciprocated, tape severing means operable at the forward limit of movement of the arm at the option of the operator, and means for adjustably limiting the return movement of said rocker arm.

20. In combination, a rocker arm, a tape guide concentric with said rocker arm, means comprising a freely pivoted dog having an eccentric surface associated with said arm for feeding the tape in one direction when said arm is reciprocated, manually operable tape severing means associated with said arm, means for rendering said severing means operative only at the end of a feeding stroke, and adjustable means for limiting the return stroke of the rocker arm.

21. In a tape feeding mechanism, a rocking feed arm, a guide for the tape concentric with the pivot of said arm, said guide being shaped so as to expose a part of said tape for action of the feed mechanism thereon, a pair of gripping members associated with said arm and arranged to cooperate with the exposed part of the said tape, and a severing mechanism for said tape, said mechanism comprising a stationary blade, a movable blade, and an operating handle mounted on said rocking feed arm.

22. The device of claim 21, in which said gripping members comprise a pivoted dog biased to engage one side of the tape, and relatively fixed member for engaging the opposite side of the tape, said dog being provided with a roughened eccentric surface so as to increase the pressure between said dog and said other member when said arm is moved in a predetermined direction relatively to the tape.

23. In a tape severing mechanism, a pair of shearing blades, one of said blades being fixed and the other being movable relatively thereto, means for mounting said blades for movement along the path of said tape, and means for preventing operation of said movable blade except at a predetermined point in the path of said tape.

24. In a tape severing mechanism, a rocker arm, a guide for the tape, concentric with the pivot of said arm, a stationary blade affixed to said arm, a movable blade pivotally mounted on said arm, means for biasing said movable blade to an open position, and means for preventing closure of said blade except at a predetermined point in the path of said tape.

25. In combination, a rocker arm, a guide for the tape concentric with the pivot of said arm, a tape feeding and a tape severing mechanism associated with said arm, a handle associated with said arm, said feeding mechanism comprising a pair of gripping members operative to grip said tape when said arm is moved in one direction, said severing mechanism comprising a blade fixed to said arm, and a movable blade pivotally associated with said arm, means for biasing said movable blade to an open position, and a handle associated with said arm for causing reciprocation thereof, said handle being arranged to cause operation of said movable blade in response to a depression thereof.

26. A guide for tape, comprising an integral strip of sheet metal having a longitudinal slot therein and provided with turned-over flanges for forming a channel for the tape.

27. A guide for tape of the character described in claim 26, provided with an extension from one of said flanges and turned backward thereon, whereby said guide may be secured to a support.

28. In a tape serving device the combination of a tape guide, comprising an integral strip of sheet metal having a longitudinal slot therein and provided with turned-over flanges for forming a channel for the tape, a tape moistening means at one end of said guide, and a tape feeder reciprocable in the arc of a circle to grip the tape and draw it forward through said guide toward the moistening means, of a knife operable at the conclusion of a feeding stroke, at the option of the operator, to sever the tape near the moistening means but in advance thereof.

29. In a device of the character described, a casing comprising a forward side plate, a rearward side plate, members whereby said plates are secured at a distance from each other, a cradle for receiving a roll of tape, an extension from said rearward side plate for supporting said cradle, a guide for the tape concentric with a point on said cradle, a stud on said extension for supporting said guide adjacent its upper end and for forming a bearing surface for the tape, a flange on said guide for supporting the same at its lower end and on said rearward side wall of the casing, a rocker arm pivotally associated with said cradle at the point with which said guide is concentric, a fixed stop for limiting the forward motion of said arm, and an adjustable stop for limiting the rearward movement thereof, said guide terminating short of said forward stop and being provided with a slot for exposing a part of the tape therein, a tape gripping mechanism associated with said rocker arm, said gripping mechanism being operative on a forward stroke of the arm and arranged to coact with the part of the tape exposed by the said slot in the guide, a severing mechanism comprising a relatively fixed blade associated with said rocker arm, and a relatively movable blade pivotally associated with said arm, a handle associated with said arm whereby the said arm may be oscillated to feed the tape, said handle being associated with said blade so that a depression thereof will cause operation of said movable blade, means for normally holding said movable blade in an open position, and a member coacting with the forward side wall of the casing for preventing operation of said movable blade except when said rocker arm is against its forward stop.

30. In a tape serving device, the combination of a tape guide, having a longitudinal slot and provided with turned over flanges forming a channel for the tape therein, an integral portion extending beyond said slot for securing the guide to a support, reciprocable means adapted to grip the tape through said slot and feed it forward and a spring pressed resistance device pressing against the tape on said integral extending portion.

31. In combination with a moistening mechanism comprising a receptacle and a brush extending outward from said receptacle, of a plate mounted above the ends of the bristles and having a surface parallel to the direction of issuance of the tape for forcing the tape into intimate contact with the ends of the bristles, and means for pivotally mounting said plate so as to permit adjustment thereof by moving the free end of the plate toward or away from the bristles to effect the proper amount of pressure between the resilient ends of the bristles and the plate.

32. In a tape serving device, the combination of a tape guide, a longitudinal slot therein, a tape moistening means at one end of said guide, a reciprocable tape feeder to grip the tape through said slot and draw it forward in the guide toward the moistening means, of a chopping knife having a handle conveniently operable at the conclusion of a feeding stroke of the feeder for severing the tape at the end of said guide and in advance of said moistening means.

33. In a tape serving device a moistening apparatus comprising a liquid receptacle, a brush in the receptacle, and a guide to direct the tape to and past the brush in contact therewith, the guide being swingable to a position to permit removal of the brush from the receptacle.

34. In a tape serving device a moistening apparatus comprising a liquid receptacle, a brush in the receptacle, and a guide to direct the tape to and past the brush in contact therewith, the guide being movable to permit the removal of the brush from the receptacle, and an adjustable stop to correctly locate the guide when it is returned to normal position.

35. In a tape serving device, the combination with tape moistening means and a reciprocable tape feeder to grip the tape and draw it toward the moistening means of a knife operable at the conclusion of a feeding stroke, at the option of the operator, to sever the tape near the moistening means but in advance thereof.

36. In a tape serving device, the combination with tape moistening means and a manually operable reciprocable tape feeder, of a chopping knife having a handle conveniently operable at the conclusion of a feeding stroke of the feeder for severing the tape near the moistening means at the option of the operator.

37. In a tape serving device, the combination of a tape guide comprising an integral strip of sheet metal having a longitudinal slot therein and provided with turned over flanges for forming a channel for the tape, a tape moistening means at one end of said guide, a reciprocable tape feeder to grip the tape through said slot and draw it forward in the guide toward the moistening means, of a chopping knife having a handle conveniently operable at the conclusion of a feeding stroke of the feeder for severing the tape at the end of said guide and in advance of said moistening means.

In testimony whereof I have affixed my signature to this specification.

THEODORE H. KRUEGER.